Figure 3:
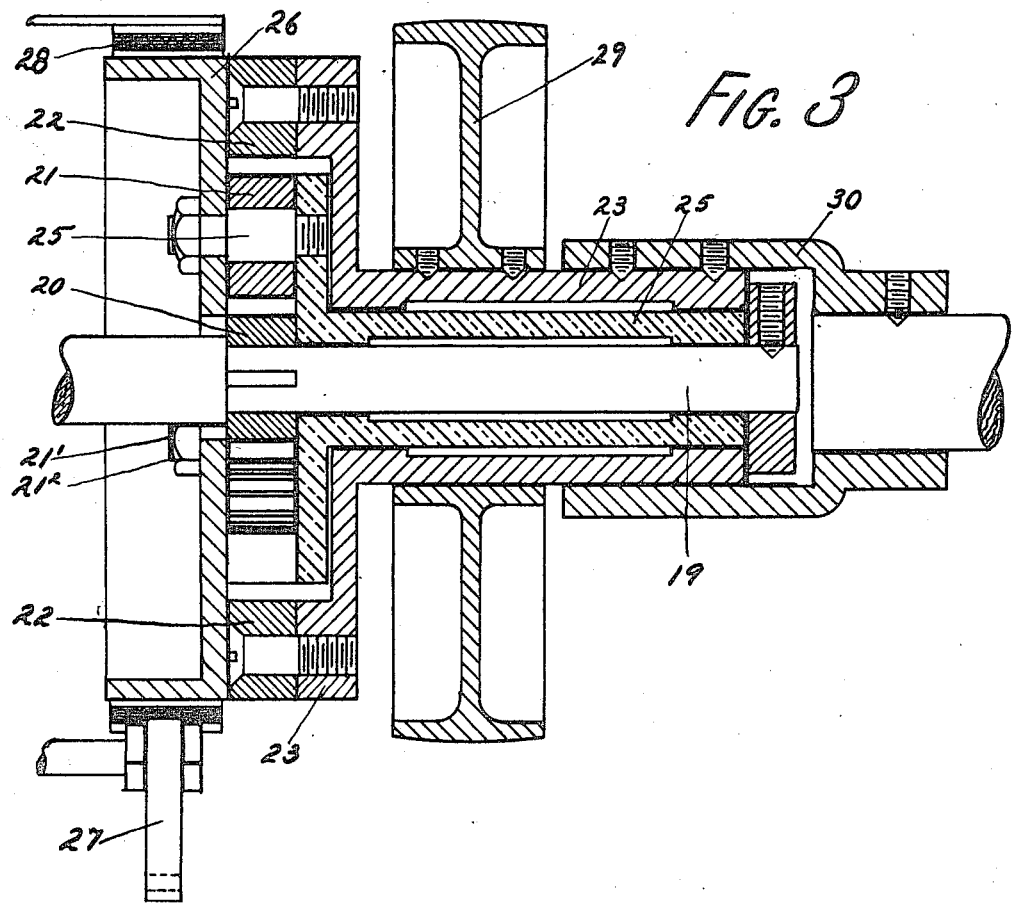

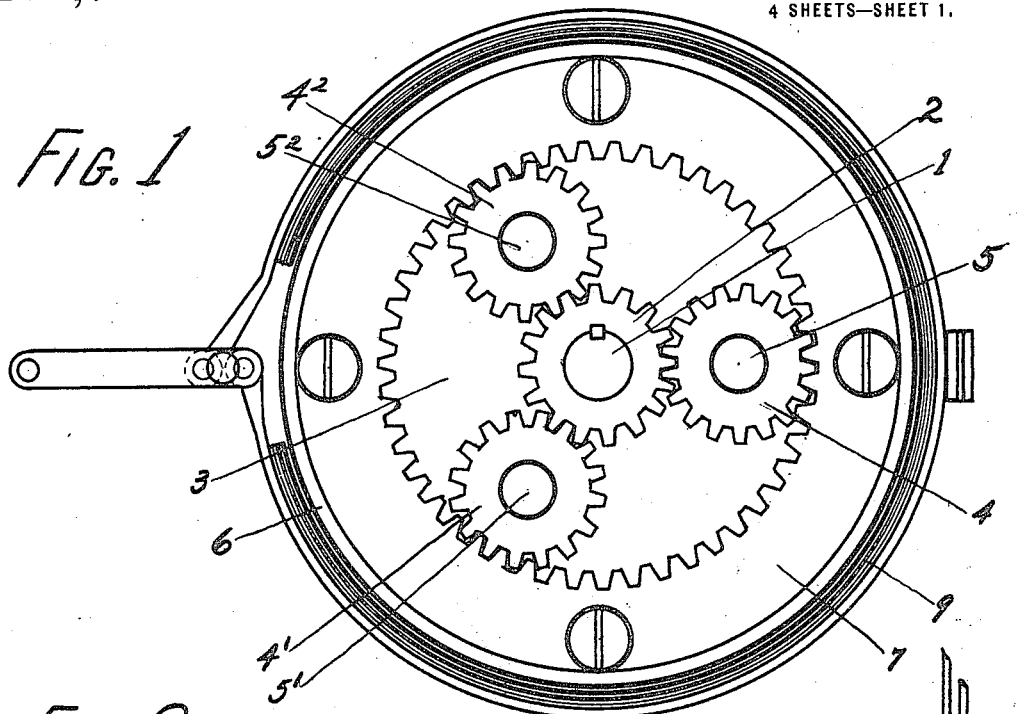
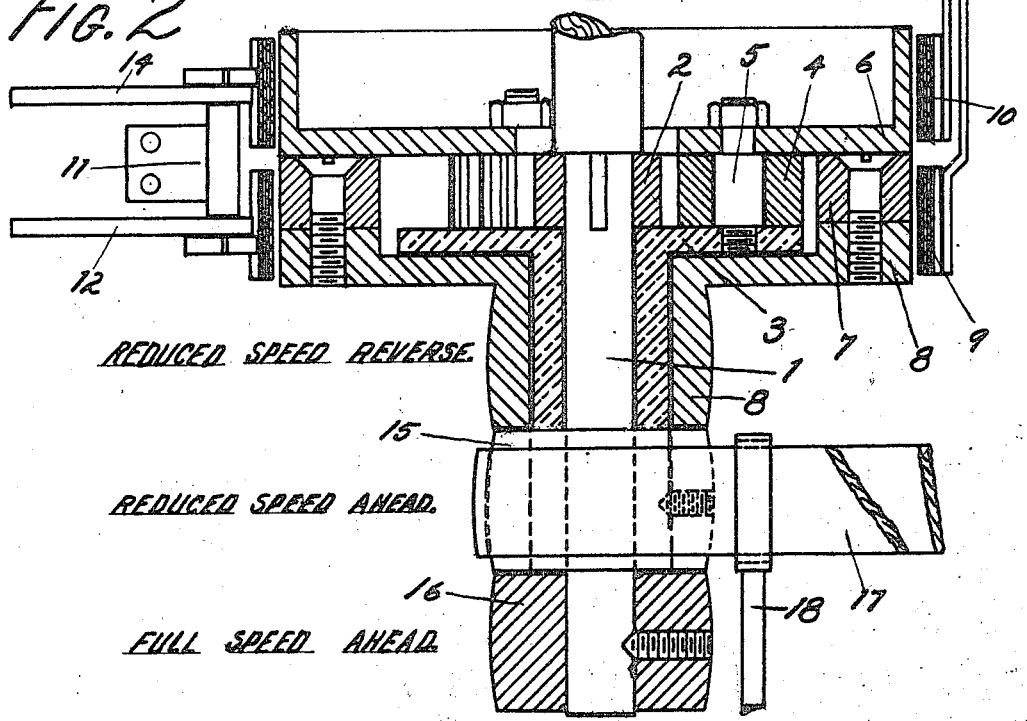

H. HERTZBERG.
PLANETARY GEARING.
APPLICATION FILED OCT. 6, 1914.

1,154,769.

Patented Sept. 28, 1915.
4 SHEETS—SHEET 2.

WITNESSES:

INVENTOR.

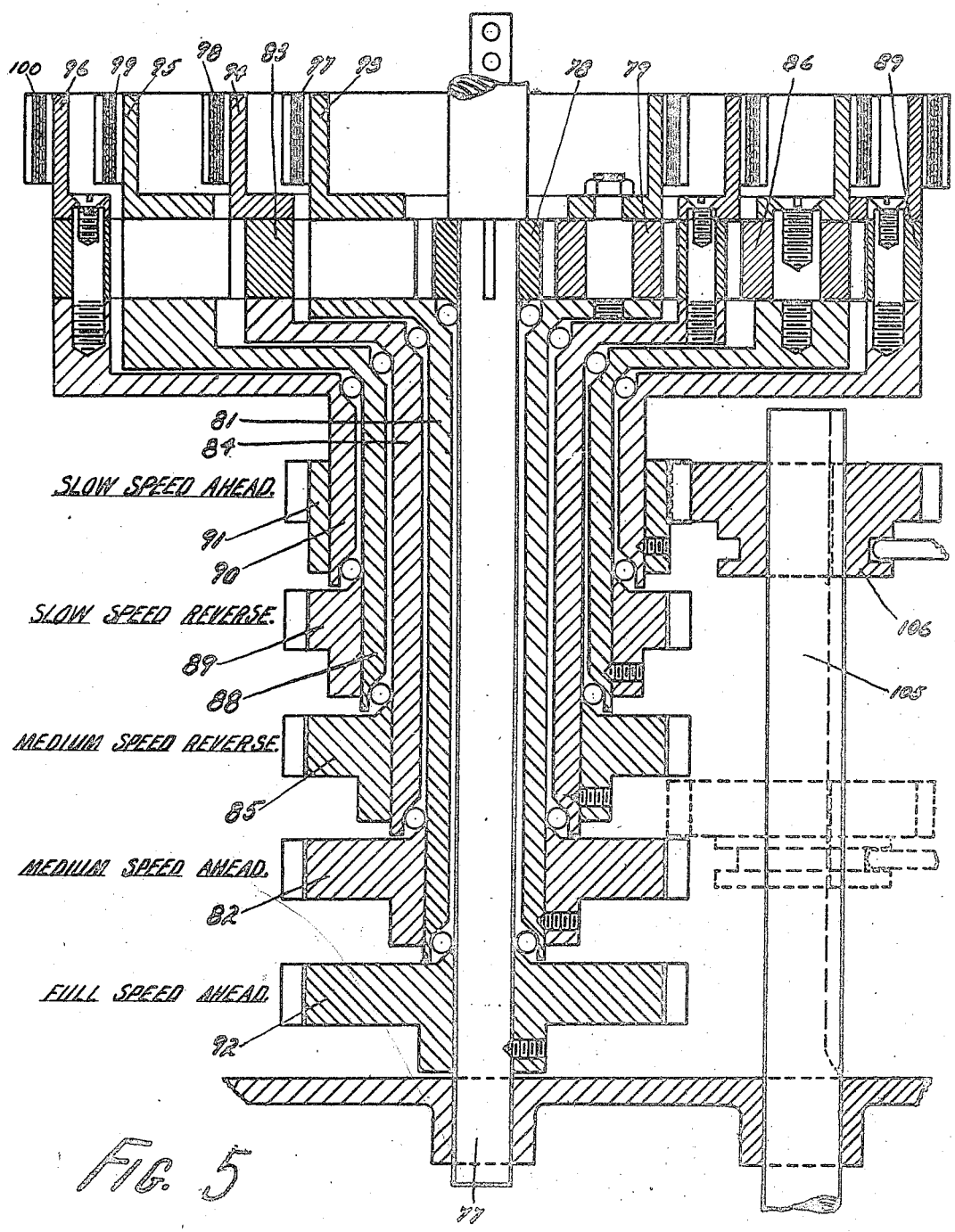

UNITED STATES PATENT OFFICE.

HARRY HERTZBERG, OF DENVER, COLORADO.

PLANETARY GEARING.

1,154,769.  Specification of Letters Patent.  Patented Sept. 28, 1915.

Application filed October 6, 1914. Serial No. 865,336.

*To all whom it may concern:*

Be it known that I, HARRY HERTZBERG, a citizen of the United States, residing at No. 1448 Newton street, in the city and county of Denver and State of Colorado, have invented certain new and useful Improvements in Planetary Gearing; and I do hereby declare the following to be a full, clear, and exact description of the invention, such as will enable others skilled in the art to which it appertains to make and use the same.

This invention relates to planetary gears and brakes combined, causing one or more members to rotate in a predetermined direction upon a common axis, the speed of the rotating members to be varied at will from a positive stop to full speed of the respective revolving members, without the use of positive clutches or throwing gears in and out of mesh, while transmitting power.

This invention contemplates and embodies a structural feature, for the above purpose, which is simple and inexpensive in first, cost and maintenance; which may be freely manipulated, easily installed on existing machinery, and readily applied to practically all machines, power driven, such as machine tools, electric brakes for railroads, hoists, pumps, ventilators, power driven hand tools, steering gears on ships, etc.

The object of this invention is to eliminate the side wear in bearings, and producing uniform wear in gears, increasing the power transmission capacity of gears, flexibility of speed control on machines using intermittent power, reducing the starting torque of motors and engines, thereby saving power and fuel.

A further object of this invention is to produce a gear that gives unlimited speed changes in either direction, gears put into mesh before the power is applied, and can throw the reverse gears into mesh as brakes without stripping same, thereby causing the power to be applied to the brakes direct, and can be made in sizes of unlimited ratios.

And still a further object of this invention is to produce a harmonious combination of a gear and brake to be used for high speed power units of light weight, for vehicles, tramway cars and locomotives, where electric motors, gas engines, steam turbines may be used, where the starting, stopping and reversing are to be made without shutting down these high speed units, operating with a great factor of control and safety.

In carrying out my invention, I employ the novel construction hereinafter fully described and claimed.

In the drawings accompanying this specification, like parts in the several views, have been given the safe reference numbers.

Figure 4:
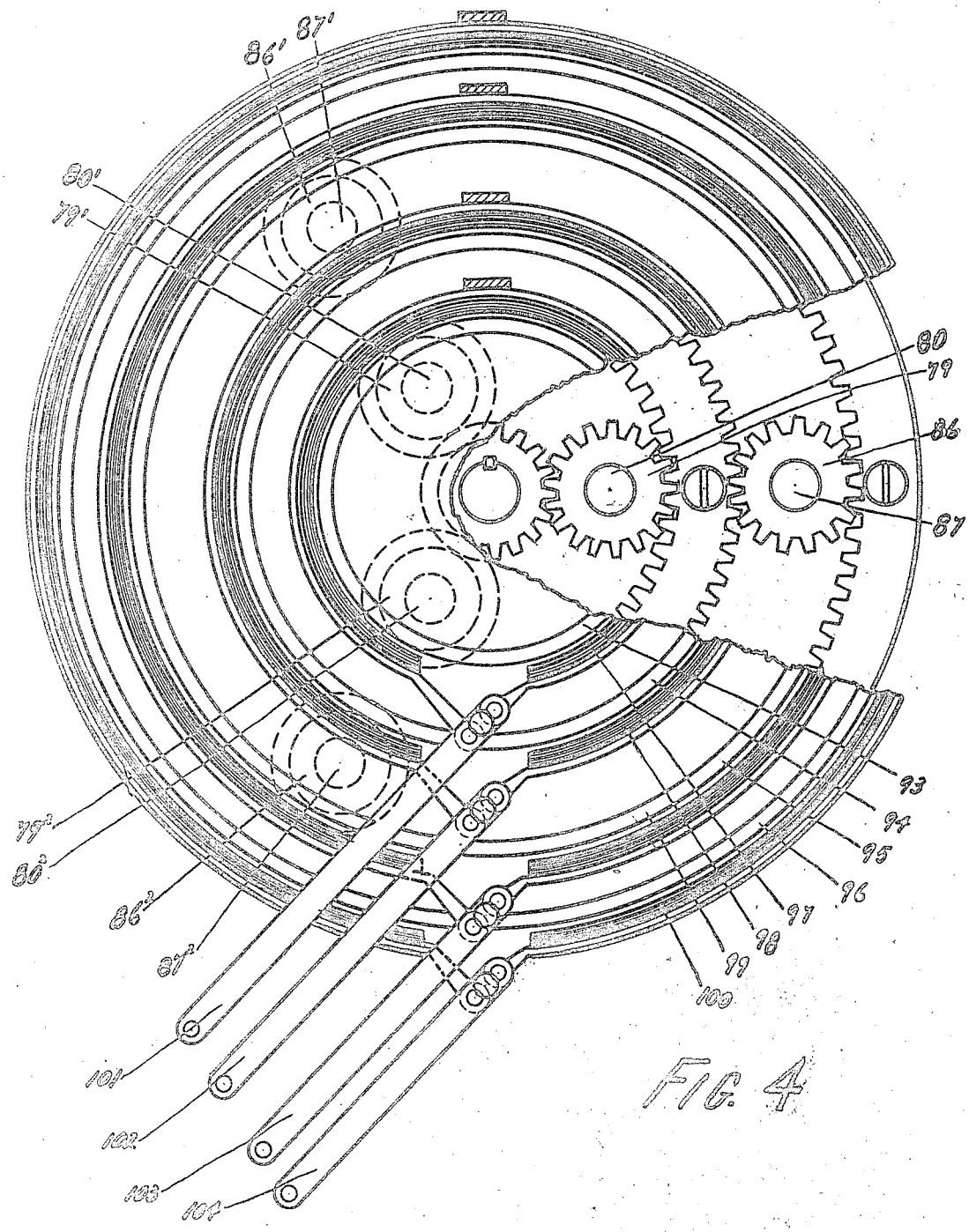

Figure 1 is an end view of the gear, showing the concentric train of gears, and brake. Fig. 2 is a sectional view of the same, showing its application to a three pulley belt drive, two speeds ahead and one reverse. Fig. 3 is a sectional view of the gear, showing its revolving members as applied to a single drive in one direction, either direct connected, or belt driven. Fig. 4 is a broken end view of a gear, having five revolving members, when used as a transmission gear for automobiles, and shows the four brakes for locking the various members to cause the desired member to rotate. Fig. 5 is a sectional view of the same, showing the five rotating members, the four braking members, a slidable gear to engage any of the rotating members, three speeds ahead and two speeds reverse.

In Figs. 1 and 2, the driving gear 2, which is substantially secured to the driving shaft 1, is always in mesh with the intermediate gears 4, $4^1$, $4^2$, these three gears revolve upon their respective studs 5, $5^1$, $5^2$, which are secured to the intermediate rotating member 3 at one end and the other end is secured to the brake ring 6. The three intermediate gears are always in mesh with the internal gear 7, which is secured to the reverse rotating member 8. Brake band 9, is loosely mounted around the ring formed by the internal gear 7, and the reverse rotating member brake 10 is loosely mounted around brake ring 6 and is actuated by brake lever 14. Both brake levers are pivoted upon support 11, pulley 15 is secured to the intermediate rotating member 3, pulley 16 is secured to the driving shaft. In operation, the driving shaft is being driven at full speed, causing pulley 16 to rotate at the full speed of said shaft, the brake levers 12 and 14 are in the off position and the belt 17 is on pulley 15, which will hold said pulley in restraint and will cause member 8 to revolve, but as soon as lever 12 is moved to tighten the brake band 9, then the pulley 15 will start to rotate, motion will be imparted to the belt, lever 12 will produce speed in member 15, in direct proportion to the slippage caused by the brake band 9, upon 7 and 8, in the opposite direction to 15, while lever 14 will produce rotary motion in 8, in direct proportion to the slippage of brake band 10 upon brake ring 6. The belt shifter 18 is shown holding belt on pulley for reduced speed ahead and is left in this position while driving a machine in this direction, while lever 12 is actuated by suitable means, such as a foot tread, and shifter 18 is only used, if increased, or full speed is desired, or to reverse speed.

In Fig. 3, the driving shaft 19 has secured to it gear 20, which is in mesh with intermediate gears 21, $21^1$, $21^2$, these intermediate gears mesh in the internal gear 22, which is secured to rotating member 23, while studs 24, $24^1$, $24^2$, secure rotating member 25 to brake ring 26. The brake lever 27 will contract brake band 28, and friction against the brake ring 26, which will cause pulley 29 and coupling 30 to rotate, the speed of which will be in direct proportion to the friction of the brake band 28, upon brake ring 26, and when brake lever 27 is in the off position, brake ring 26 revolves, while the pulley and coupling are at rest.

In Fig. 4 and Fig. 5, the driving shaft 77 has the gear 78 rigidly secured to it, which meshes into the three intermediate gears 79, $79^1$, $79^2$, which revolve upon studs 80, $80^1$, $80^2$, which are secured to medium speed ahead member 81, upon which is secured gear 82. The intermediate gears mesh into the internal gear 83, which is secured to the medium speed reverse member 84, upon which is secured gear 85. The periphery of the internal gear 83 has gear teeth which mesh into three gears 86, $86^1$, $86^2$, and revolve upon their respective studs 87, $87^1$, $87^2$, which are secured to rotating member 88, upon which is secured slow speed reverse gear 89. The gears 86, $86^1$, $86^2$, mesh into the internal gear 89, which is secured to rotating member 90, upon which is secured slow speed ahead gear 91. Gear 92 is secured to the constantly rotating motor shaft and is used for high speed ahead only, the speed of which can only be altered by varying the speed of the motor. The brake rings 93, 94, 95 and 96 are secured so as to revolve with members 81, 84, 88 and 90, respectively, and loosely fitted to these brake rings are their respective brake bands 97, 98, 99 and 100, which are actuated by their respective levers 101, 102, 103 and 104. A driven shaft 105 which connects with the propeller of the vehicle has a slidable gear 106, fitted to slide upon this shaft, which is provided with a keyway to prevent said gear from idling. This gear will engage any of the five gears sliding from one to the other until it is in mesh with the desired gear. The respective brake levers are actuated to give rotary motion to the desired member. When using the ahead gears, levers 102 and 103 are used singly, or together. When using the reverse gears, then levers 101 and 104 are used singly or together. Connecting levers may be provided to make the change of gears, selective automatically. It is not to be understood, however, that the invention is limited in this respect to any particular material or form, as shown and described as it will be evident that may changes may be made in the details of construction shown, and described without departing from the scope of the invention.

Having thus described my invention, what I claim and desire to protect by Letters Patent of the United States is:

1. In gearing of the class described, a driving member, a sun gear secured thereto, an internal gear, intermediate gears meshing with the sun gear and internal gear, a carrier for the intermediate gears, a brake element on the carrier, a brake element on the internal gear, and a rotating member secured to the carrier as a means for transmitting power.

2. In gearing of the class described, a driving member, a sun gear secured thereto, an internal gear, intermediate gears meshing with the sun gear and internal gear, a carrier for the intermediate gears, a brake element on the carrier, a brake element on the internal gear, a rotating member secured to the carrier, a rotating member secured to the internal gear, a rotating member secured to the driving member, a shifting element slidably secured and coöperating with the said members.

3. In gearing of the class described, a driving member, a sun gear secured thereto, an internal gear, intermediate gears meshing with the sun gear and internal gear, a carrier for the intermediate gears, a carrier for the internal gear, said internal gear having external teeth, a second internal gear, intermediate gears meshing with the external teeth and second internal gear, a carrier for second intermediate gears, a carrier for second internal gear, brake elements on the intermediate gear carriers, brake elements on the internal gears and brake mechanism coöperating with each element.

4. In gearing of the class described, a driving member, a sun gear secured thereto, an internal gear, intermediate gears meshing with the sun gear and internal gear, a carrier for the intermediate gears, a carrier for the internal gear, said internal gear having external teeth, a second internal gear, intermediate gears meshing with the external teeth and second internal gear, a carrier for second intermediate gears, a carrier for second internal gear, brake elements on the intermediate gear carriers, brake elements on the internal gears, a brake mechanism coöperating with each element, and a rotating member secured to each carrier.

5. In gearing of the class described, a driving member, a sun gear secured thereto, an internal gear, intermediate gears meshing with the sun gear and internal gear, a carrier for the intermediate gear, a carrier for the internal gear, said internal gear having external teeth, a second internal gear, second intermediate gears meshing with the external teeth and second internal gear, a carrier for second intermediate gears, a carrier for second internal gear, brake elements on the intermediate gear carriers, brake elements on the internal gears, a brake mechanism coöperating with each element, a rotating member secured to each carrier, a driven shaft, a slidable member attached thereto, engaging any rotating member and means for sliding the same.

HARRY HERTZBERG.

Witnesses:
W. F. LANHAM,
L. F. PFISTER.